United States Patent [19]
Takano et al.

[11] 3,767,399
[45] Oct. 23, 1973

[54] PHOTOSENSITIVE COMPOSITION CONTAINING AN ALDOL NAPHTHYLAMINE AS COLOR FORMER AND A HALOGENATED HYDROCARBON AS PHOTOACTIVATOR

[75] Inventors: Hiroshi Takano; Hitoshi Nakajima; Kenzo Harada, all of Saitama; Yukio Miura, Tokyo, all of Japan

[73] Assignee: Asahi Kasei Kogyo Kabushiki Kaisha, Tokyo, Japan

[22] Filed: Dec. 3, 1971

[21] Appl. No.: 204,728

[30] Foreign Application Priority Data

Dec. 19, 1970 Japan ............................ 45/113603

[52] U.S. Cl. ................ 96/48 R, 96/48 QP, 96/90 R
[51] Int. Cl. ................................................ G03c
[58] Field of Search .............. 96/90 R, 48 QP, 48 R

[56] References Cited

UNITED STATES PATENTS 3,502,476 3/1970 Itano et al. ......................... 96/90 R
3,394,395 7/1968 Mattor et al. ...................... 96/90 R

*Primary Examiner*—Norman G. Torchin
*Assistant Examiner*—Won H. Louie, Jr.
*Attorney*—Robert D. Flynn et al.

[57] ABSTRACT

A novel non-silver direct print-out photosensitive composition is made from a mixture of an aldol naphthylamine compound and an organic halide capable of discharging halogentated carbon radicals by irradiation of light. A binder and a sensitizer are preferably added to this composition. A photosensitive printing material suitable for photographic printing paper may be produced by dissolving or dispersing this composition into a solvent, applying the solution to a support, and evaporating the solvent. Image formation is conducted by direct printing. Either a dry-system fixing or a wet-system fixing may be applied to the printed image. This photosensitive material is extremely excellent in resistance to ozidation, resolving power, sensitivity, reproducibility of color and resistance to chemicals, and stable before and after exposure.

13 Claims, No Drawings

PHOTOSENSITIVE COMPOSITION CONTAINING AN ALDOL NAPHTHYLAMINE AS COLOR FORMER AND A HALOGENATED HYDROCARBON AS PHOTOACTIVATOR

FIELD OF THE INVENTION

This invention relates to a novel non-silver direct print-out photosensitive composition for providing photosensitive materials. More particularly, this invention relates to a photosensitive composition excellent in stability, which comprises a mixture of an aldol naphthylamine compound having a specific structure and a compound capable of discharging halogenated carbon radicals by irradiation of light.

BACKGROUND OF THE INVENTION

Heretofore, a photosensitive composition comprising an arylamine and an organic halide has already been proposed (U.S. Pat. Nos. 3,042,515, 3,082,086 and 3,502,476). However, the arylamines behave merely as colour former and their sensitivity is extremely low. Moreover, they are easily oxidized in air. A photosensitive material obtained from the composition encountered many difficulties, mainly because the arylamines are too easily oxidized. That is, storage stability of the photosensitive system was poor before and after exposure. A prolonged storage of a colored image after fixation was impossible. Special stabilizers are required to improve the storage property of the photosensitive material, with the result that the procedure for producing photosensitive materials is very complicated.

SUMMARY OF THE INVENTION

We, the present inventors, have now found that an aldol naphtylamine compound defined below gives a photosensitive composition, an excellent resistance to oxidation and an excellent storage stability. For example, such compound as 1(α-naphthylimino)-3-hydroxy butane or N,N-di-2-methyl-3-hydroxy-1-pentenyl-α-naphthylamine which are conventionally used as anti-oxidants for plastics or synthetic rubbers, generated hydrogen radicals through pyrolysis or photolysis when they are heated or irradiated by ultra-violet ray whether they are in the state of powders or solutions in non-polar solvents. This fact is observed by electron spin resonance absorption. The aldol naphthylamine compound and the hydrogen radical formed thereby are approximately in an equilibrium state. These hydrogen radicals prevent thermal oxidation or photo-oxidation. As the aforesaid aldol naphthylamine compound behaves as a photo-activator as well as color former, color change occurs according to a mechanism substantially different from that of the formerly proposed composition. That is, when the photosensitive composition containing the aldol naphthylamine compound in place of arylamines of prior art is irradiated by light, the aldol naphthylamine compound as well as the organic halide are activated to form free radicals. The color change reaction may thereby proceed in such a way that the free radicals thus formed react with each other through a chain reaction to form stable dyestuffs at a high speed.

In accordance with the present invention, there is provided a photosensitive composition, which comprises at least one of the aldol naphthylamine compounds defined below and the organic halide capable of discharging halogenated carbon radicals by irradiation of light.

The aldol naphthylamines are a. at least one of aldol naphthylamine compounds selected from 1-(α-(or β-)naphthylimino)-3-hydroxy alkane of the formula

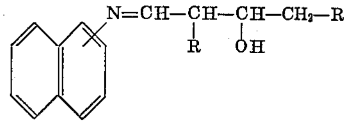

(I)

wherein R is a hydrogen atom or an alkyl group having from one to five carbon atoms and the substituent group on the naphthalene ring is in α or β position, and N,N-di-3-hydroxy-alkenyl-α-(or β-)naphthylamine of the formula

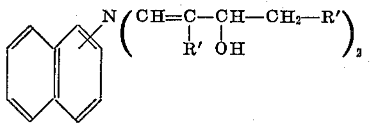

(II)

wherein R′ is a hydrogen atom or an alkyl group having from one to five carbon atoms and the substituent group on the naphthalene ring is in α or β position.

The aldol naphthylamine compounds of the formulas (I) and (II) are, for example, 1-(α-naphthyl-imino)-3-hydroxy butane (R in the formula (I) is hydrogen atom), 1-(α-naphthylimino)-2-methyl-3-hydroxy pentane (R in the formula (I) is methyl group), 1-(β-naphthylimino)-3-hydroxy butane (R in the formula (I) is hydrogen atom, N,N-di-3-hydroxy-1-butenyl-α-naphtylamine (R′ in the formula (II) is hydrogen atom), N,N-di-3-hydroxy-1-butenyl-β-naphthylamine (R′ in the formula (II) is hydrogen atom), N,N-di-2-methyl-3-hydroxy-1-penetenyl-α-naphthylamine (R′ in the formula (II) is methyl group), N,N-di-2-methyl-3-hydroxy-1-pentenyl-β-naphthylamine (R′ in the formula (II) is methyl group), and the like.

These compounds of the formulas (I) and (II) may easily be produced by condensation of aldol condensates and naphthylamines.

The organic halide used as a photo-activator component in the photosensitive composition of the present invention may be any compound capable of discharging halogenated carbon radicals by irradiation of light. Usually, the following compounds are preferable.

1. $R\text{-}CX_3$ wherein R represents a hydrogen atom, a halogen atom, a substituted or unsubstituted alkyl, aryl or heterocyclic residual group, and X represents a halogen atom.

The organic halides of this formula include carbon tetrabromide, iodoform, pentabromoethane, 2,2,2-tribromoethanol, α,α,α-trichlorotoluene, diphenyl-2,2,2-tribromoethane, p-nitrobenzotrichloride, dichlorobromomethane, bromal, 2-w,w,w-trichloromethyl-6-nitrobenzothiazole, w,w,w-tribromoquinaldine, 4-w,w,w-tribromomethyl pyridine and the like.

(2) $$R'\text{—}\underset{\underset{O}{\|}}{C}\text{—}CX_3$$

wherein R′ represents a hydrogen atom, an amino group or a substituted or unsubstituted aryl group, and X represents a halogen atom.

The organic halides of this formula include p-nitro-αα,α-tribromoacetophenone, α,α,α-p-tetrabromoacetophenone, $\alpha,\alpha,\alpha$-tribromoacetophenone, o-nitrol-$\alpha,\alpha,\alpha$-tribromoacetophenone, $\alpha,\alpha,\alpha,\alpha,\alpha,\alpha$-hexabromo-p-diacetyl benzene, tribromoacetamide and the like.

3. R - $SO_2$ - $CX_3$, or R - SO - $CX_3$ wherein R represents an aryl group which may be substituted, a heterocyclic residual group or an alkyl group, and X represents a halogen atom.

The compounds of these formulas include hexabromodimethylsulphone, hexabromodimethylsulphoxide, trichloromethylphenylsulphone, 2-tribromomethylsulphonyl-6-methyoxybenzotriazole, 1-methyl-2-tribromomethylsul-phonylbenzimidazole, 2-tribromomethylsulphonyl-5-chlorobenzothiazole and the like.

The photosensitive composition according to the present invention may preferably contain a binder and a sensitizer, in addition.

Substances preferably used as binders include those having film forming property or those which promote the adhesion of the aldol naphthylamine type compound and the organic halide in the composition to the flat surface of a support. They may include cellulose derivatives such as nitrocellulose, acetylcellulose, ethylcellulose, propionylcellulose or the like. They may further include vinyl polymers such as polyvinyl chloride, polyvinyl alcohol, polyvinyl acetate, polystyrene, vinyl chloride-vinylidene chloride copolymer, polymethylmethacrylate or the like, synthetic rubbers such as an acrylonitrile-butadiene copolymer, a styrene-maleic acid anhydride copolymer, chlorinated polyethylene or the like a solid paraffinic hydrocarbon such as neicosane and so on. These binders may be used alone or in a mixture. These binders facilitate the formation of a uniform coating on a support in any thickness and the adhesiveness of the coated film to the surface of the support. In addition, even when an organic halide having sublimating property is used, the use of such binder prevents the sublimation thereof, whereby storage property of the photosensitive materials before exposure may be improved.

The sensitizers which may be used in the present invention include two different species. One is the so-called color sensitizer which increases sensitivity of printing materials by widening the range of sensitive wavelengths to the region of visible light. The other is the sensitizer which increases sensitivity of printing materials regardless of the range of the sensitive wavelengths thereof. The preferable dyestuffs or dyestuff bases which belong to the former are acridine dyestuff, merocyanine dyestuff, cyanine dyestuff, styryl dyestuff or the like which are conventionally used in the prior art of photography. They are, for example, Methylene Blue, Acridine Red, Acridine Orange, Rose Bengal, p-dimethylaminobenzylidene-4-quinoline, p-dimethylaminobenzylidene-2-quinoline, p-diethylamino-benzylidene-2-pyridine, p-dimethylaminobenzylidene-2-pyridine, p-dimethylaminobenzylidene-4-pyridine, 1,3-dimethyloxa-2'-carbocyanine-p-toluenesulphonate, 1,-3-diethylthio-4'-carbocyanine iodide and the like. The preferable dyestuffs which belong to the latter are aldehydes, pyrazoline derivatives, benzoin derivatives, benzil derivatives or the like. For example, benzaldehyde, benzil, benzoin, dimethylaminobenzaldehyde, salicyl aldehyde, thiosalicyl aldehyde, ascorbic acid, orthophthal-dialdehyde, vanillin, phenyl acetaldehyde, 1,3-diphenyl-5-p-chlorophenyl pyrazoline, 1,3-diphenyl-5-p-dimethylaminophenyl pyrazoline and the like may be preferably used. By the use of these sensitizers, the sensitivity of printing materials may be increased by from two to 15 times.

The support which may be used for the production of the photosensitive material may be any solid substance which is capable of supporting the aforesaid aldol naphthylamine compound and the organic halide in a uniform mixture, i.e., in the form of surface coating, internal dispersion or immersion. For example, various synthetic resin films, woven fabrics, papers, metal plates, metal foils, glasses, earthenwares, woods or the like may preferably be used as the supports.

The ratio of the amount of the aldol naphthlamine compound to that of the organic halide in the photosensitive composition according to the present invention is from 80 : 1 to 1: 60, preferably from 20 : 1 to 1 : 15, in terms of the molar ratio. The amount of the binder which may be added to the photosensitive composition of the present invention is from 0.05 to 20, preferably from 0.1 to 10, parts by weight per one part by weight of the total amount of the aldol naphthylamine compound and the organic halide. The amount of the sensitizer is preferably 0.05 part by weight or less per one part by weight of the total amount of the aldol naphthylamine compound and the organic halide.

A photosensitive material may easily be produced from the photosensitive composition of the present invention by dissolving or dispersing the aforesaid aldol naphthylamine compound and organic halide, preferably together with a binder and a sensitizer, into a suitable solvent, applying the thus obtained solution or dispersion to a support by way of coating or impregnation and drying the support to evaporate the solvents. The solvent should of course be selected from those which are good solvents for the aldol naphthylamine compound, the organic halide, the binder and the sensitizer. In particular, solvents, having a high solubility for the binder are preferred. For example, acetone, benzene, toluene, methyl ethyl ketone, ethyl acetate, tetrahydrofuran, dioxane, a mixed solvent of acetone with benzene, a mixed solvent of acetone with tetrahydrofuran, a mixed solvent of acetone with ethyl acetate, a mixed solvent of acetone with methylenedichloride or the like are suitable solvents. Evaporation may be conducted by drying in air when volatile solvents are used. On the other hand, it may be conducted by heating in a drier at 50°C to 80°C when non-volatile solvents are used.

The method for image formation is a direct printing procedure, comprising placing a negative film or a negative manuscript on the printing photosensitive material prepared according to the procedure as described above and irradiating the photosensitive system by a light emitted at a certain distance from a light source such as a xenone lamp, a mercury lamp or the sunlight.

The method for fixing after the image formation may be either a dry system or a wet system. The dry system comprises deactivating or gasifying the residual organic halides by heating. In the dry system, heating may be conducted from 0.5 to 5 minutes so that the temperature of the surface of the photosensitive material may become from 80° to 150°C by the use of an infrared-ray lamp, a heating plate or a heating roll. The wet system comprises removing both unaltered aldol naphthylamine compound and the organic halide or only the organic halide through dissolution by the use of suitable solvents. In the wet system, the exposed photosensitive material may be treated for from 0.5 to 5 minutes by the use of suitable solvents which remove residual unaltered substance through dissolution without dissolving the dyestuff formed by the exposure, more preferably, also without dissolving the binder. Thus a stable image is obtained. Suitable solvents for this solvent fixing include benzene, ethylether, acetone, cyclohexane, a mixed solvent of cyclohexane with ethyl acetate or the like.

The photosensitive material produced from the photosensitive composition of the present invention possesses many improved characteristics as photosensitive materials as well as excellent physical properties. It also brings various advantages in the process for production thereof. That is, the image formed is a colored image of brown or black on a colorless ground. The image formed is excellent in resolving power (1,000 lines/mm or more) and so stable that it possesses an excellent storing property. Furthermore, the image formed is beautifully reproduced in halftone. The sensitivity of this photosensitive material is higher as compared with the conventional non-silver system. The sunlight can be used as a light source for the direct print-out system. Simple developing and fixing procedures may be employed and even a fixing procedure may be omitted in some particular purpose of uses. Even in such a case, an image stable for a long time may be formed. The aldol naphthylamine compound used in the present invention is cheap, since it is easily produced.

The aldol naphthylamine compound contained in the photosensitive composition according to the present invention possesses an excellent resistance to oxidation and gives a photosensitive composition and a photosensitive material which are excellent in storage stability. The photosensitive composition according to the present invention are excellent in storing property without further addition of a stabilizer. In addition, on behalf of the excellent resistance to oxidation of the aldol naphthylamine compound, the support for the present photosensitive composition such as solid paraffinic hydrocarbon, synthetic resin, woven fabric and paper or the like is also protected from degradation in air, whereby the sensitive system can be stored stably before exposure. Further, in the case where the aldol naphthylamine compound remains after the removal of unaltered organic halide alone in the dry fixing or in the wet fixing after exposure as described above, fading or fogging of the colored image as well as the degradation of support is prevented.

The present photosensitive composition is suitable for a photographic printing paper, a copying paper, a photosensitive material for planography, relief printing, microfilm or holography and the like.

The present invention will now further be explained by referring to the following Examples, wherein all 'parts' and '%' are by weight, unless otherwise defined.

Example 1

A photosensitive liquid having the following composition was prepared.

N,N-di-2-methyl-3-hydroxy-1-pentenyl-β-naphthylamine 3.0 g
Pentabromoethane 3.0 g
Benzene 100 cc This liquid was immersed into a sheet of photographic baryta paper under a yellow safety lamp. Thus, after drying, a photosensitive printing material was produced. A negative film for a scanning-type electron microscope was superposed on the printing material obtained. Exposure was effected for 10 seconds at a distance of 30 cm by the use of a USHIO 500 W mercury lamp (Lamphouse No. UI 501, super high voltage mercury lamp No. USH 500). A brown image was immediately formed on a white ground.

Then, the image formed printing mateial was dipped into a fixer of benzene. An image which was entirely stable to light was obtained.

Example 2

A sheet of photographic body paper, which had been surface treated by coating with 1 g/m$^2$ of polyvinyl alcohol having a polymerization degree of 800, was coated with a photosensitive liquid having the following composition. After drying, a photosensitive material was obtained.

1-(α-naphthylimino)-2-methyl-3-hydroxy pentane 182.5 g
2,5-dimethyl-α,α, α-tribromo acetophenone 4.0 g
Benzoin 0.05 g
Acetylcellulose 10 g
Acetone 40 cc
Benzene 60 cc A 36 mm negative film for Röntgen was superposed on the surface of this photosensitive printing material and exposure was effected thereover for 5 seconds at a distance of 30 cm by using a USHIO 500 W mercury lamp to obtain a brown image. After removal of the negative film, the total surface of the printing material was irradiated by a 175 W reflex-type infrared-ray lamp for 3 minutes at a distance of 15 cm to stabilize the image.

Example 3

A photosensitive liquid prepared according to the following recipe was coated on a sheet of baryta paper under a yellow safety lamp to obtain a photosensitive printing material.

1-(α-naphthylimino)-3-hydroxybutane 3.0 g
1-methyl-2-tribromomethylsulphonyl benzimidazole 3.5 g
1,3-diphenyl-5-p-dimethylaminophenyl pyrazoline 180.1 g
Acetylcellulose 8 g
Benzene 70 cc
Acetone 30 cc Upon this photosensitive material was layed a 36 mm negative film for air-photograph and exposure was effected for 5 seconds by using a USHIO 500 W mercury lamp. Subsequently, this printing material having an image was dipped for one minute into a mixed solvent of ethyl acetate and cyclohexane to carry out a solvent fixation. A stable brown image excellent in resolving power was obtained on a white ground.

Example 4

Into a photosensitive liquid, which had been prepared according to the following recipe was dipped for 20 seconds a spot film for thin layer chromatography the surface of which had been coated with cellulose.

Hexabromoethane 4.5 g
N,N-di-2-methyl-3-hydroxy-1-pentenyl-α-naphthylamine 4.0 g
Benzene 100 cc After withdrawal of the spot film out of the liquid, the solvent was immediately evaporated. The thus obtained spot film, on which had been superposed a negative film, was exposed to the sunlight in midsummer for 10 minutes. After removal of the negative film, the spot film was irradiated for 5 minutes by a 175 W reflex-type infrared-ray lamp at an appropriate distance. A stable black image was obtained. Even when the fixing operation was omitted, the obtained image was stable for about one month.

Example 5

A phtosensitive liquid, which had been prepared according to the following recipe, was coated on a sheet of Kent paper or art paper to obtain a photosensitive printing material, whereby the thickness of coating was controlled to about 3 mils.

N,N-di-3-hydroxy-1-butenyl-β-naphthylamine 3.5 g
Hexachloroethane 4.0 g
Polystyrene 8 g
Benzene 100 cc A negative film was superposed on this printing material and irradiation was effected for 15 seconds by using a USHIO 500 W mercury lamp to obtain a dark brown image. Fixing was conducted by the use of ethylether through removal of unaltered substances, whereby a stable image was obtained.

Example 6

N,N-di-3-hydroxy-1-butenyl-α-naphthylamine 3.5 g
Carbon tetrabromide 3.0 g
Polystyrene 10 g
Benzene 100 cc A photosensitive liquid having the above composition was coated on a sheet of baryta paper under a yellow safety lamp to a thickness about 2 mils and dried. A negative film was superposed on this printing material and irradiation was conducted for 5 seconds by a USHIO 500 W mercury lamp at a distance of 30 cm. A black image excellent in resolving power was immediately printed. An extremely stable image was obtained after a fixing either by dipping the printed image for one minute into ethylether to remove unaltered substances or by irradiating the printed image by means of a 175 W reflex-type infrared-ray lamp for 5 minutes at a distance of 15 cm to remove unaltered carbon tetrabromide. The sensitivity of this photosensitive system was about twice as much as that of a commercially available diazo-sensitive paper.

Example 7

Into 10 parts of benzene solvent were added 0.5 part of eicosane and 0.05 part of polystyrene, and then further added 0.4 part of N,N-di-3-hydroxy-1-butenyl-α-naphthylamine and 0.5 part of carbon tetrabromide. The solution was stored in a brown bottle before put into use. This solution was coated on a zinc plate in an appropriate thickness and thereafter benzene was evaporated. A negative film was superposed on this plate and the superposed plate was exposed to a 500 W mercury lamp irradiation continued for 10 seconds to print a black image thereon. Immediately after the exposure, the image was stabilized by irradiation of a 175 W reflex-type infrared-ray lamp continued for 5 minutes at a distance of 15 cm, and then washed with benzene. The surface of this plate was subsequently subjected to a corrosive treatment in a 6 % nitric acid aqueous solution, whereby the non-light struck area of a zinc plate was removed through dissolution to obtain a relief image.

We claim:

1. A photosensitive composition, which comprises a. at least one aldol naphthylamine compound selected from the group consisting of 1-(α-(or β-) naphthylimino)-3-hydroxy alkane of the formula

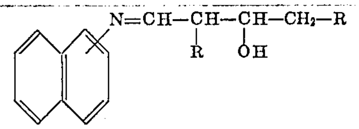

(I)

wherein R is a hydrogen atom or an alkyl group having from 1 to 5 carbon atoms and the substituent group on the naphthalene ring is in α or β position, and N,N-di-3-hydroxy-alkenyl-α-(or β-)naphthylamine of the formula

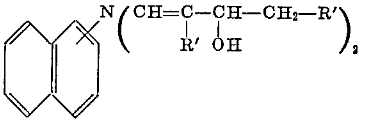

(II)

wherein R' is a hydrogen atom or an alkyl group having from one to five carbon atoms and the substituent group on the naphthalene ring is in the α or β position, and b. an organic halide capable of discharging halogenated carbon radicals by irradiation of light.

2. The photosensitive composition according to claim 1, wherein a binder and a sensitizer are contained.

3. The photosensitive composition according to claim 2, wherein the binder is at least one of nitrocellulose, acetylcellulose, ethylcellulose, propioncellulose, polyvinyl alcohol, polyvinyl chloride, polyvinyl acetate, polystyrene, polyethylene, polymethylmethacrylate, vinyl chloride-vinylidene chloride copolymer, acrylonitrile-butadiene copolymer, styrenemaleic acid anhydride copolymer, chlorinated polyethylene and a solid paraffinic hydrocarbon such as n-eicosane.

4. The photosensitive composition according to claim 2, wherein the sensitizer is Methylene Blue, Acridine Red, Acridine Orange, Rose Bengal, p-dimethylaminobenzylidene-4-quinoline, p-dimethylaminobenzylidene-2-quinoline, p-diethylaminobenzylidene-2-pyridine, p-dimethylaminobenzylidene-2-pyridine, p-dimethylamino-benzylidene-4-pyridine, 1,3-dimethyloxa-2'-carbocyanine-p-toluenesulphonate, 1,-3-diethylthio-4'-carbocyanine iodide, benzaldehyde, benzil, benzoin, dimethylaminobenzaldehyde, salicylaldehyde, thiosalicylaldehyde, ascorbic acid, ortho-phthal-dialdehyde, vanillin, phenyl acetaldehyde, 1,3-diphenyl-5-p-dimethylaminophenyl pyrazoline or 1,3-diphenyl-5-p-methoxyphenyl pyrazoline.

5. The photosensitive composition according to claim 1, wherein the molar ratio of at least one of the compounds of the formula (I) or (II) to the organic halide is from 80 : 1 to 1 : 60.

6. The photosensitive composition according to claim 2, wherein from 0.05 to 20 parts by weight of a binder and 0.05 part or less by weight of a sensitizer is added per one part by weight of the total amount of the aldol naphthylamine compound and the organic halide.

7. A process for printing an image directly, which comprises superposing a negative film or a negative manuscript paper on a photosensitive material and irradiating light thereover by means of a xenon lamp, a mercury lamp or sunlight, said photosensitive being prepared by dissolving or dispersing (a) the aldol naphthylamine compound and (b) the organic halide as defined in claim 1 together with or without a binder and a sensitizer into a solvent, applying the solution to a support by way of coating or impregnation and evaporating the solvent.

8. A dry system fixing method applied to the photosensitive material after image formation in claim 7, which comprises heating the surface of the photosensitive material to a temperature of from 80° to 150°C by means of an infrared-ray lamp, a heating plate or a heating roll.

9. A wet system fixing method applied to the photosensitive material after the image formation in claim 7, which comprises removing through dissolution only unaltered organic halides or both unaltered organic halides and aldol naphthylamine compounds by the use of benzene, ethylether, a mixed solvent of ethyl acetate and cyclohexane, toluene, cyclohexane, methanol or ethanol.

10. The photosensitive composition according to claim 1, wherein the aldol naphthylamine compound of the formula (I) or (II) is 1-(α-naphthylimino)-3-hydroxy butane, 1-(α-naphthylimino)-2-methyl-3-hydroxy pentane, 1-(β-naphthylimino)-3-hydroxy butane, N,N-di-3-hydroxy-1-butenyl-α-naphthylamine, N,N-di-3-hydroxy-1-butenyl-β-naphthylamine, N,N-di-2-methyl-3-hydroxy-1-pentenyl-α-naphthylamine or N,N-di-2-methyl-3-hydroxy-1-phentenyl-β-naphthylamine.

11. The photosensitive composition according to claim 1, wherein the organic halide is pentabromoethane, carbon tetrabromide, hexachloroethane, 2-w,w,w-tribromomethyl-6-nitrobenzothiazole, w,w,w-tribromoquinaldine, p-nitro-α,α,α-tribromoacetophenone, hexabromodimethylsulphoxide, trichloromethylphenylsulphone, 2-tribromo-methylsulphonyl-6-methoxylbenzothiazole or 1-methyl-2-tribromomethylsulphonylbenzimidazole.

12. The photosensitive composition according to claim 2, wherein the aldol naphthylamine compound is 1-(α-naphthylimino)-3-hydroxybutane, N,N-di-3-hydroxy-1-butenyl-α-naphthylamine or 1-(α-naphthylimino-2-methyl)-3-hydroxypentane, the organic halide is pentabromoethane, hexachloroethane, carbon tetrabromide, 1-methyl-2-tribromomethylsulphonylbenzimidazole or 2,5-dimethyl-α,α,α-tribromoacetophenone, the binder is polystyrene, acetylcellulose, polymethylmethacrylate or vinyl chloride-vinylidene chloride copolymer, and the sensitizer is benzil, benzaldehyde, salicyl aldehyde, 1,3-diphenyl-5-p-chlorophenylpyrazoline, Acridine Red or p-diethylaminobenzylidene-2-pyridine, the molar ratio of the aldol naphthylamine compound to the organic halide being from 20 : 1 to 1 : 15, and the amount of the binder and the sensitizer being from 0.1 to 10 parts by weight and 0.05 part or less by weight, respectively, per one part by weight of the total amount of the aldol naphthylamine compound and the organic halide.

13. A photographic printing paper, a copying paper, a microfilm, and a sensitive material for holography, planography or relief printing, wherein the photosensitive composition is as defined in claim 1 and is supported on a support of a material selected from the group consisting of synthetic resin film, woven fabric, paper, metal plate, metal foil, glass, earthenware and wood.

* * * * *